US005807459A

United States Patent [19]

Merle

[11] Patent Number: 5,807,459

[45] Date of Patent: Sep. 15, 1998

[54] APPARATUS AND METHOD FOR SEPARATING SPLICED STRIPS OF PHOTOGRAPHIC FILM

[75] Inventor: Thomas C. Merle, Rochester, N.Y.

[73] Assignee: Eastman Kodak Company, Rochester, N.Y.

[21] Appl. No.: 819,402

[22] Filed: Mar. 17, 1997

[51] Int. Cl.[6] .......... B32B 35/00

[52] U.S. Cl. .......... 156/344; 156/584; 29/426.5

[58] Field of Search .......... 156/344, 584, 156/157, 304.3, 304.6; 29/426.1, 426.5

[56] References Cited

U.S. PATENT DOCUMENTS

| | | | |
|---|---|---|---|
| 3,986,919 | 10/1976 | Andrews . | |
| 4,323,201 | 4/1982 | Gonzalez . | |
| 5,373,339 | 12/1994 | Greene et al. | 156/344 |
| 5,473,402 | 12/1995 | Long et al. . | |
| 5,608,487 | 3/1997 | Pierce et al. | 156/584 X |

*Primary Examiner*—Mark A. Osele
*Attorney, Agent, or Firm*—Francis H. Boos, Jr.

[57] ABSTRACT

A semi automatic film de-splicer that non-destructively separates film strips from splice tapes attached to the film strips with thermal adhesive. A reciprocating heat shoe is operated in two de-splicing cycles to press and heat the splice tape adhesive separately in each adhesive region of the tape. In the first cycle, in which one film strip is restricted from movement, the other film strip is placed in tension by a tensioning device mounted on the film strip holding roller. When the adhesive is softened and the heat shoe is released, the tensioned pulls the film strip free of the splice tape. The heat shoe then presses and reheats the free end of the splice tape against an underlying pickup web to tack the splice tape to the web. The web is then advanced to place the remaining adhesive region attaching the splice tape to the other film strip under the heat shoe and the other film holding roller is placed in tension. The heat shoe is then actuated in a second de-splicing cycle to press and heat the second adhesive region allowing the tensioned roller to pull the remaining film strip free of the splice tape when the heat is released. The web is then advanced to remove the tacked-on splice from the area of the heat shoe allowing a new film splice to be inserted into the de-splicer.

7 Claims, 7 Drawing Sheets

APPARATUS AND METHOD FOR SEPARATING SPLICED STRIPS OF PHOTOGRAPHIC FILM

FIELD OF THE INVENTION

The invention relates to photography, and the removal of splices from the ends of film strips. More specifically the invention relates to the non-destructive separation of film strips from splices with the ends of the film strips intact.

BACKGROUND OF THE INVENTION

Typically exposed photographic film is spliced together for development and printing to facilitate handling of the film in automated equipment. Individual film rolls are removed from their containers, called cartridges or cassettes, and the resulting film strips are coupled together end-to-end with splices. The coupled strips form a long ribbon that is threaded and follows a sinuous path through processing equipment, into and out of developing solutions and drying chambers. Most of the processing steps are completed in the dark. Such rough handling, and the severe consequences of a break, require a secure attachment at every splice. The splices include a tough paper or plastic backing coated with a thermal adhesive. Usually the splices are applied to the film strips with heat and pressure.

In the case of 135 mm film, after processing, the film is cut to remove the splices and again to divide the film strip corresponding to a complete customer order into smaller segments, such as four, five or six negative frames per segment. This is anticipated during film manufacture, when leaders and trailers at the ends of the film strips are provided with extra material.

In a newly introduced photographic system, generally referred to as the Advance Photographic System (APS), the film strips are returned after processing to a cartridge similar to the cartridge used for loading the film into the camera. The splice may still be removed by cutting, but the cut film strip must then be reinserted into the cartridge for return to the customer. Although cutting is a simple approach for removing splices, it obviously damages and shortens the film compared to its manufactured state. APS film strips have a special configuration at their leading and trailing ends. At the trailing end the shape facilitates attachment of the film to a spool inside the cartridge. At the leading end the shape reduces friction at the cartridge exit to facilitate thrusting out of the film for viewing or reordering prints. When the film is cut, the configuration and its accompanying features either are lost, or must be included in the cutting die.

Film strips typically are manufactured with extra material to accommodate splice removal during processing. Again the approach is simple, but adds material expense, including silver, a precious metal. This material then must be disposed of after processing. The amounts are small when compared to a single film strip, but build up at the photofinishing level. Silver is a heavy metal that requires special disposal procedures. For the foregoing reasons, therefore, it is desirable to provide apparatus and methods for removing the splice tape from film strips after the processing steps without damaging the leading and trailing ends of the filmstrips.

In commonly assigned U.S. Pat. No. 5,373,339, non-destructive, automated method and apparatus for de-splicing photographic film is shown in which a film splice and splice pick-up web are positioned between a vertically reciprocating heat shoe and an platen. The heat shoe is pressed down to the splice to heat the thermal splice adhesive thereby allowing the film strips to be pulled free of the splice when the heat shoe pressure is removed. In order to retain the detached splice tape in position over the splice pickup web while the films are pulled apart, a retaining rod aligned with the splice space between the two film strips is pressed up through the platen surface to hold the splice tape against the heat until the films have been removed Once the films are removed, the heat shoe and retaining rod are then lowered to tack the splice tape to the splice pickup web and the web is advanced to remove the splice tape from the area of the heat shoe. While satisfactory for its purpose, it requires accurate positioning of the film in the heat shoe area to ensure proper alignment of the retaining rod with the splice space between the film strips. Additionally, if the film strips are contiguous, without any space between the film strips, it requires that the film strips be cut to separate them from each other, which damages the film strip ends leaves the splice tape on the film ends, an unsatisfactory situation, particularly at the leader end which can interfere with smooth thrusting of the film strip from its storage cartridge.

SUMMARY OF THE INVENTION

In accordance with the invention therefore, there is provided apparatus for separating first and second photographic film strips from a splice tape, the film strips being attached with thermal adhesive to first and second regions, respectively, of the splice tape. The apparatus comprises a platen; and a reciprocating heat shoe operable to press against the splice tape in successive de-splicing cycles. The apparatus also includes means for positioning a splice pickup web between the spliced film and the platen, means for placing the first film strip under tension after positioning the first region of the splice tape between the hot shoe and the platen, and means for restricting movement of the second film strip while the first film strip is held under tension. The heat shoe is operable during a first de-splicing cycle to press against the first region of the splice tape to soften the adhesive in the first region and allow the tension on the first film strip to pull the first film strip free of the splice tape. The hot shoe is further operable during the first de-splicing cycle to press the first region of the splice tape onto the pickup web thereby tacking the splice tape to the web. The apparatus further includes means for placing the second film strip under tension after positioning the second region of the splice tape between the hot shoe and platen; the hot shoe then being operable in a second de-splicing cycle to press against the second region of the splice tape to soften the adhesive in the second region and allow the tension on the second film strip to pull the second film strip free of the splice tape.

In accordance with a second aspect of the invention, method of separating photographic film strips attached to first and second adhesive regions of a splice tape comprises the steps of positioning the first splice tape region between a hot shoe and a platen; positioning a pickup web between the hot shoe and platen on a side of the films opposite to the splice tape; restricting the film strip attached to the second splice tape region from movement; placing the film strip attached to the first splice tape region under tension; bringing the hot shoe and platen together under pressure in a first de-splicing cycle to heat and soften splice tape adhesive in said first splice tape region; and releasing the pressure on the first splice tape region sufficiently to allow one film strip to be pulled free of the splice tape. The method further comprises the steps of bringing the hot shoe and platen together under pressure after removal of the first film strip to adhere the first region of the splice tape to the carrier web, positioning said second splice tape region between said hot shoe and platen; placing the other film strip attached to the second splice tape region under tension; bringing the hot shoe and platen together under pressure in a second de-splicing cycle to heat the adhesive in the second splice tape region; and releasing said second cycle pressure to allow the other film strip to be pulled free of the splice tape.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
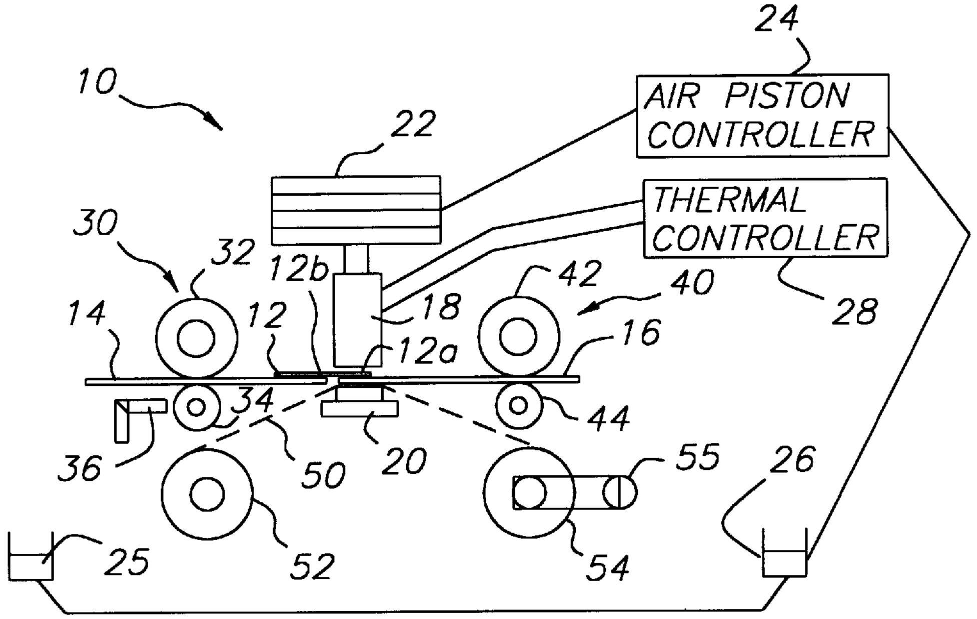
FIG. 1 is a side schematic view of the film de-splicer apparatus of the invention.

Referring to FIG. 1, a preferred embodiment of film de-splicer apparatus 10 is depicted for removing the leading and trailing ends of two film strips 14 and 16, respectively, from splice tape 12. The de-splicer apparatus includes a reciprocating hot shoe 18 and an opposed platen 20 that move relative to each other for capturing and heating the splice tape 12. Film positioning and tensioning roller mechanisms 30 and 40 are located, respectively, on opposite sides of the hot shoe 18 and serve to hold the film strips with the splice tape 12 in place between the hot shoe and platen. The roller mechanisms each include tensioning means to hold the film strips selectively under tension during successive cycling of the hot shoe for separating the film strips from the splice in a manner to be described. A splice pickup web 50 extends from a supply reel 52 to a drive wheel 54 and is positioned between the spliced film strips and the platen to receive and remove splice tape after being separated from the film strips.

Figure 2:
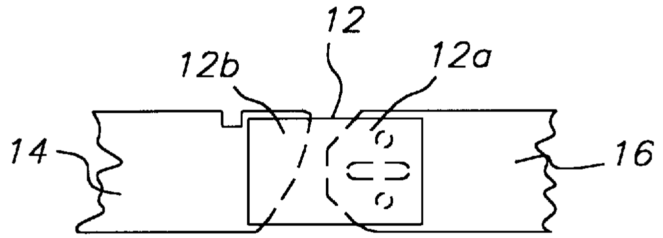
FIG. 2 is a plan view of a film strip splice.

Splice tape 12 is typical of products used by the photofinishing industry today and includes treated paper with a layer of thermal adhesive on one surface. Examples of such adhesive include Buna S, a poly(styrene-cobutadiene) and Buna N, a poly(acrylonitrile-cobutadiene), both widely available to the industry under a number of trade names. The splice tape 12 is applied to the film strips 14 and 16 at separated regions 12*a* and 12*b*, respectively, of the splice as shown in FIG. 2. Splice tape 12 is applied to film strip 14 and 16 with heat and pressure. The film strips thus are coupled securely together to make up a continuous web of film strips for film processing applications. The adhesive is a thermoplastic and will soften beginning at approximately 120° C.

Heat shoe 18 is coupled to an air piston 22 which is controlled by air piston controller 24 upon actuation by spaced-apart manual switches 25,26, to move the heat shoe in reciprocal manner to press against splice tape 12 in successive de-splicing cycles to soften the thermal adhesive separately in each of the separate splice tape regions 12*a* and 12*b*. The roller mechanisms 30 and 40 comprise upper and lower rollers 32,34 and 42,44, respectively, for capturing and holding the film strips during the de-splicing operation. Both of the roller mechanisms are of similar construction and will be described in connection with roller mechanism 40 in reference to FIGS. 4–9. As illustrated therein, the rollers 42, 44 are rotatably mounted on end supports 60, 62. Axle 43 of upper roller 42 is journalled at its back end to a hinged section of 60 and has its front end releasably engaged in slot 63 of front support 62 to allow the roller to be raised for insertion of a film strip between roller 42 and roller 44. An over-center, spring-loaded lock 64 captures and holds the axle 43 in slot 63 when the axle is inserted into the slot after a film strip is positioned between the rollers. A tensioning device 66 is provided on the front end of the axle 45 for lower roller 44. Tensioning device 66 includes a manually operated tension-setting disc 68 mounted on axle 45 so as to be rotatable around and axially slidable relative to the axle. Knobs 74*a*, 74*b* facilitate manual operation of the tensioning disc. A coil tension spring 76 is secured at one end to the axle 45 and at the other end to the tensioning disc 68 to place the film captured between roller 42 and 44 under tension when the disc 68 is rotated, clockwise in the case of roller 44 and counterclockwise in the case of roller 34. A locking finger 70 extends inwardly from disc 68 toward support 62 to engage one of several holes 78 formed in support 62 when the tensioning disc is slid towards the support after rotating the disc to put the roller under tension. Notch 72 serves to prevent the locking finger from slipping out of the hole. A locking device 36 is provided for releasably engaging the lower roller 34 to prevent movement of film strip 14 during a first de-splicing cycle in which film strip 16 is separated from region 12*a* of splice tape 12. The length of the rollers is preferably made approximately equal to the width of the film strip so that when the upper roller is locked down on the film, the pressure of the rollers will provide enough frictional force between the lower roller surface and the film surface to prevent rotation of the lower roller when rotational tension is applied to roller 34 or 44 by the respective tensioning device.

Figure 3A:
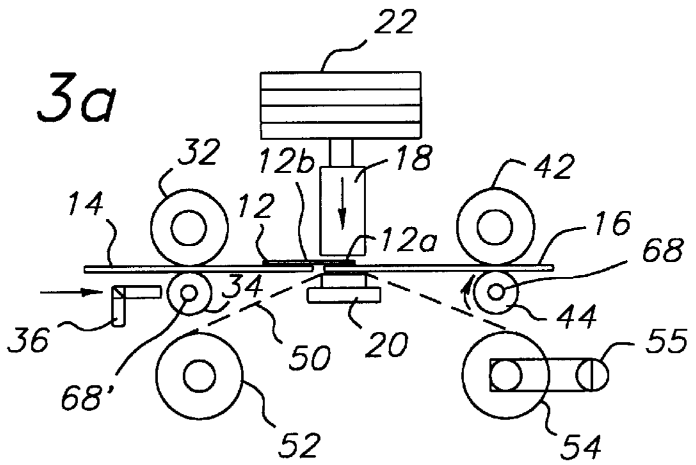
FIGS. 3*a*–3*h* are side schematic views of the FIG. 1 de-splicer illustrating sequential stages of operation of the apparatus.
Figure 3B:
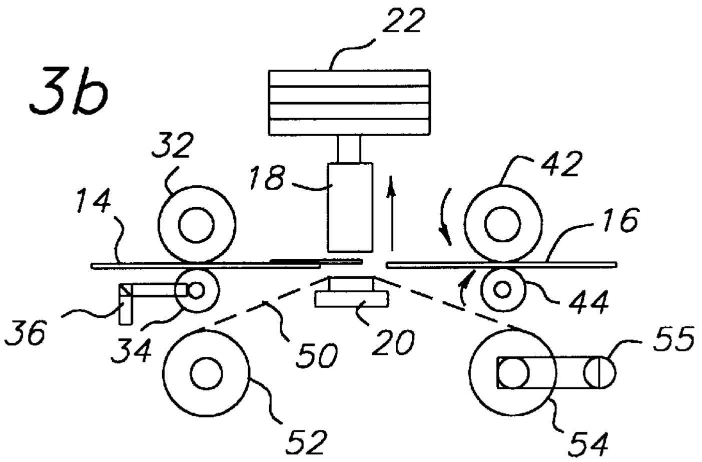
Figure 3C:
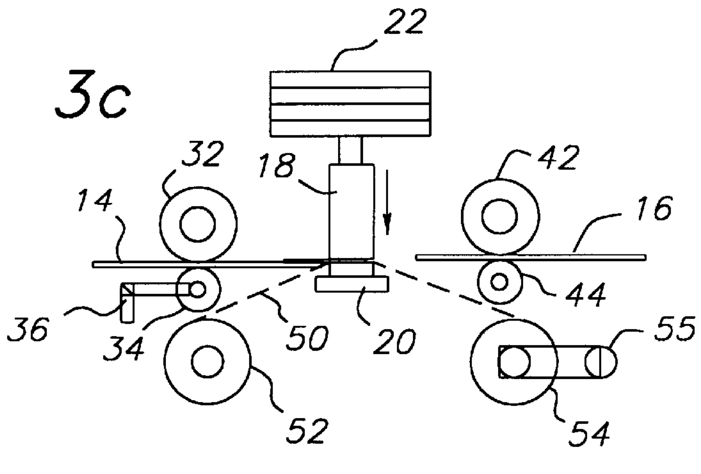
Figure 3D:
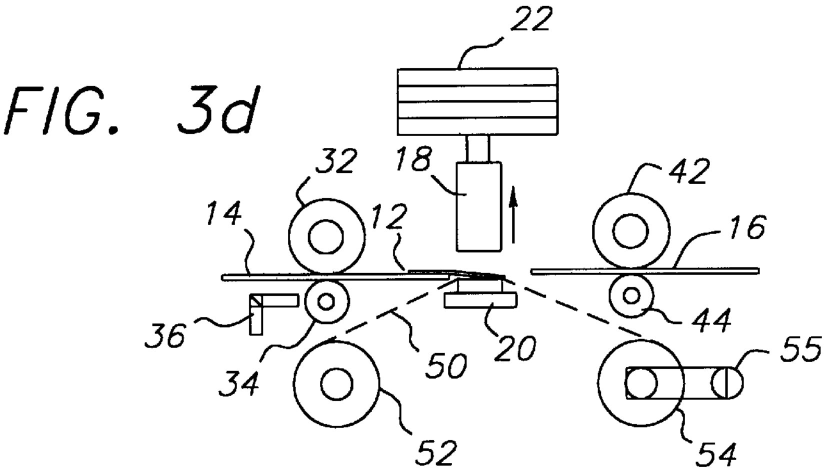
Figure 3E:
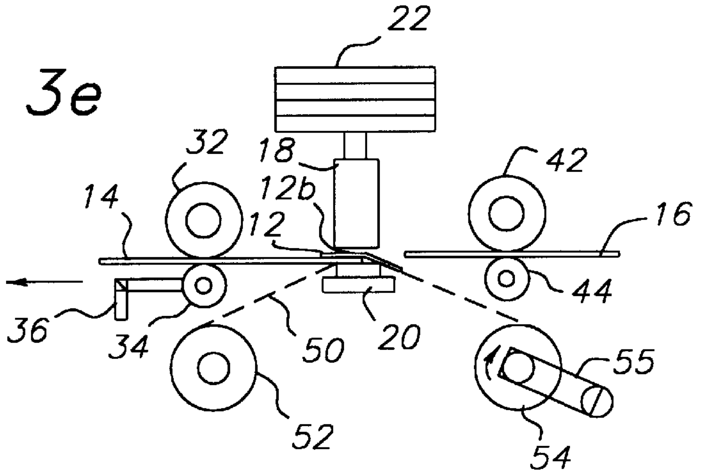
Figure 3F:
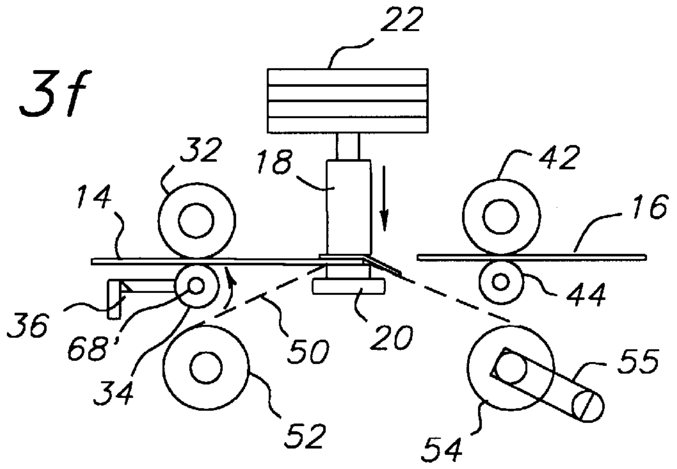
Figure 3G:
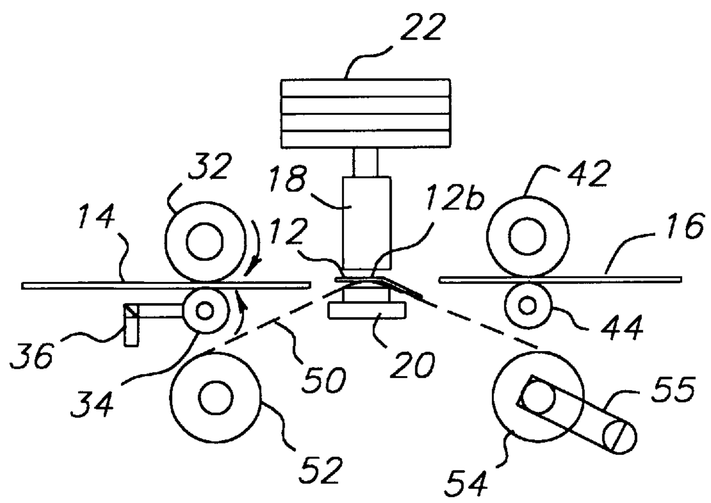
Figure 3H:
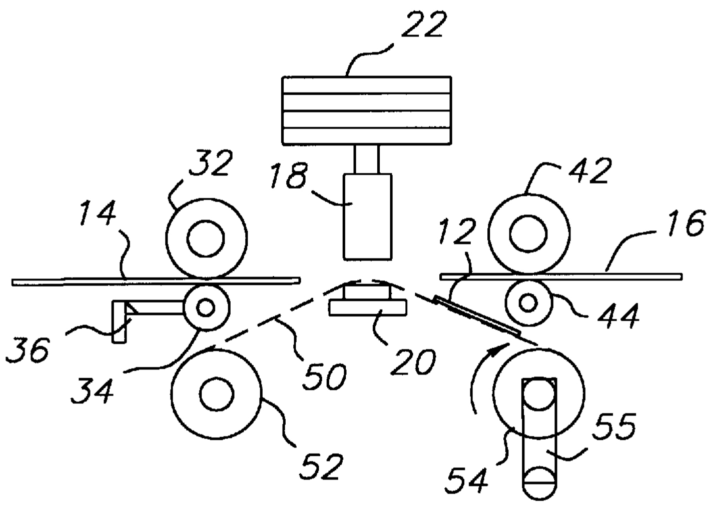
Figure 5:
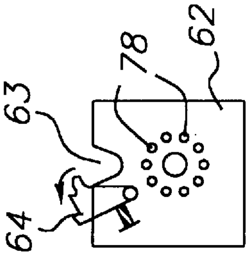
FIG. 5 is an end view of supports for the film tensioning rollers of FIG. 4.
Figure 4A:
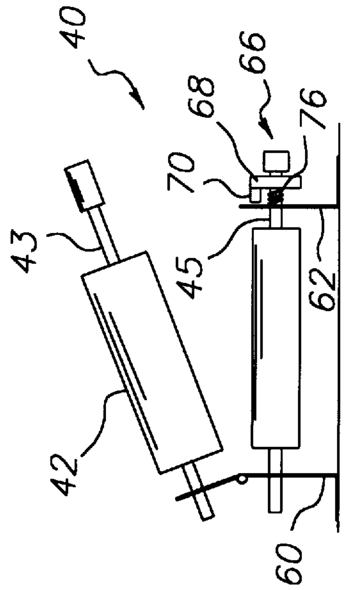
FIGS. 4*a*–4*b* are side views of film tensioning rollers constituting a portion of the de-splicer apparatus of FIG. 1.
Figure 4B:
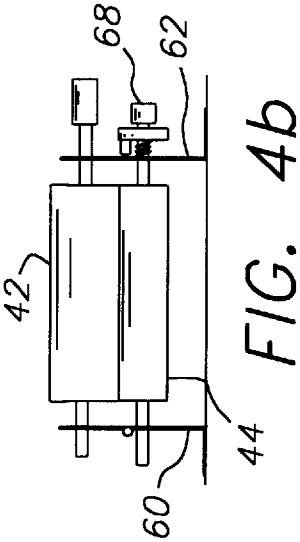
Figure 7:
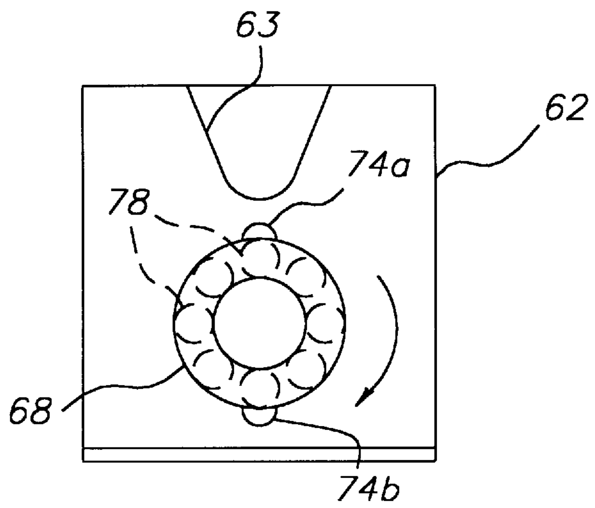
FIGS. 6–9 are views of the film tensioning rollers and supports of FIG. 4 illustrating additional details of the tensioning device embodied therein.
Figure 8:
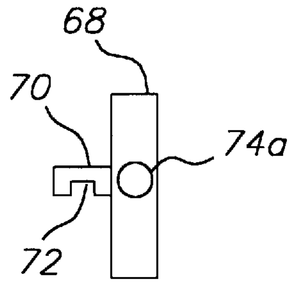
Figure 6:
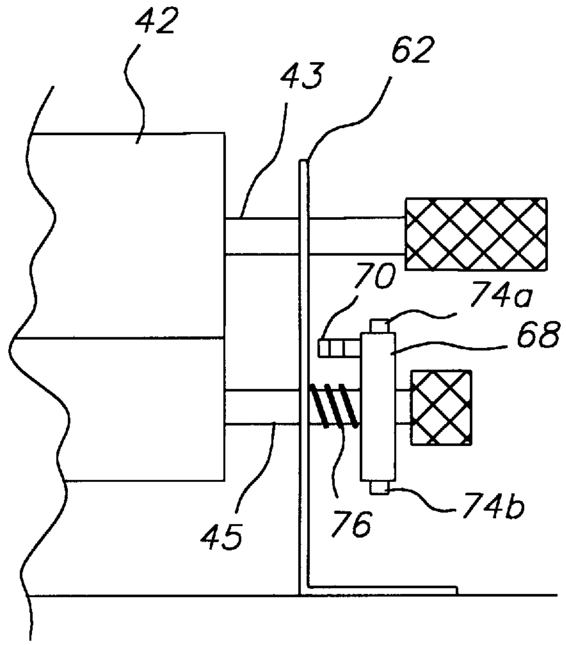
Figure 9:
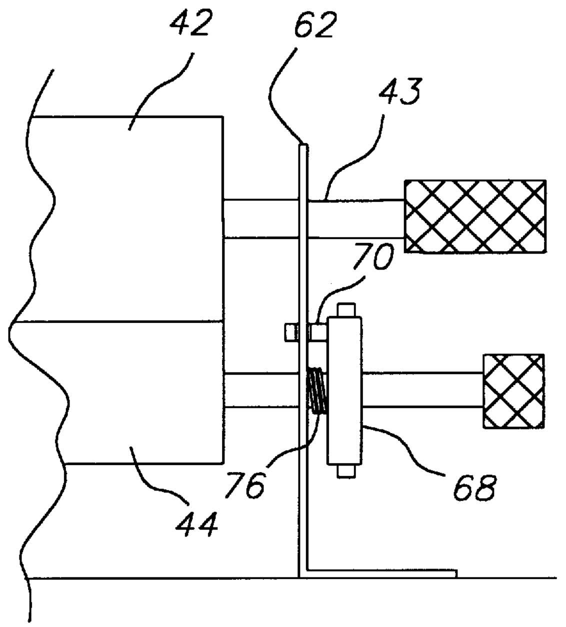

The operation of the de-splicing apparatus will be described with reference to FIGS. 3*a*–3*h*. In FIG. 3*a*, spliced film strips 14 and 16 are shown placed between their respective rollers 32, 34 and 42, 44. Splice pick up web 50 is positioned between splice tape 12 and platen 20. The film strips are positioned by the operator with splice tape region 12*a* aligned with hot shoe 18 and platen 20. Splice tape region 12*b* is positioned to the left of the hot shoe area. Locking device 36 is placed in engagement with roller 34 to restrict movement of film strip 14 during the first de-splicing cycle in which film strip 16 is to be separated from splice tape 12. Tensioning disc 68 on roller 44 is rotated clockwise and locked in place to hold film strip 16 in tension against the restraining force applied by roller 34 to film strip 14. The air piston controller 24 is then activated by the operator depressing switches 25, 26 to initiate the first de-splicing cycle as shown in FIG. 3*a* in which hot shoe 18 is pressed against region 12*a* of the splice tape to heat and soften the thermal adhesive holding the splice tape to film strip 16. When the thermal adhesive is softened, the switches are released allowing air piston controller 24 to raise hot shoe 18 slightly as shown in FIG. 3*b* to release the pressure on the splice tape 12 thereby allowing the tensioned roller 44 to pull film strip 16 free from splice tape 12. Once the film strip 16 is separated from the splice, switches 25,26 are again depress to allow the hot shoe 18 to be moved downward to press the splice region 12*a* under pressure against the splice pick up web 50 as shown in FIG. 3*c*. The adhesive is reheated and the splice tape region 12*a* is thereby tacked to the pick up web 50. The switches are then released allowing hot shoe 18 to move upwards as shown in FIG. 3*d* to release the pressure on the splice thereby completing the first de-splicing cycle. As seen in FIG. 3*e*, locking device 36 is released from roller 34 to allow the operator to rotate web drive reel 54, using crank 55, to pull the web to the right thereby advancing the film strip 14 and splice tape 12 so as to position splice tape region 12*b* under the hot shoe 18. Preferably, reel 55 is provided with a ratchet and pawl mechanism, not shown, to prevent counterclockwise rotation of the reel after the film and splice have been advanced as described. Once the splice region 12*b* is positioned under the hot shoe, the operator rotates tensioning disc 68' (FIG. 3*f*) on roller 34 counterclockwise to place film strip in tension against the restraining force applied by reel 54 through splice tape 12 tacked onto the pick up web 50. A second de-splicing cycle is then initiated by actuating switched 25, 26 to move hot shoe 18 downward pressing against splice tape 12. The hot shoe heats and softens the adhesive in splice tape region 12*b*. The switches 25,26 are then released to raise the hot shoe as shown in FIG. 3*g* to release pressure on the splice tape thereby allowing the tensioning force exerted by roller 34 to pull film strip 14 free of splice tape 12. Reel 54 is then rotated clockwise by the operator as shown in FIG. 3*h* to pull the splice tape away from the de-splicing area after which the upper rollers 32 and 42 can be released and raised by the operator for removal of the de-spliced film strips and insertion of another pair of spliced film strips.

The invention has been described in detail with particular reference to certain preferred embodiments thereof, but it will be understood that variations and modifications can be effected within the spirit and scope of the invention.

What is claimed is:

1. Apparatus for separating first and second photographic film strips from a splice tape, said film strips being attached with thermal adhesive to first and second regions, respectively, of the splice tape, the apparatus comprising:

a platen;

a reciprocating heat shoe operable to press against the splice tape in successive de-splicing cycles;

means for positioning a splice pickup web between the spliced film and the platen;

means for placing said first film strip under tension after positioning said first region of the splice tape between the hot shoe and the platen;

means for restricting movement of the second film strip while said first film strip is held under tension;

said heat shoe being operable during a first de-splicing cycle to press against said first region of the splice tape to soften said adhesive in the first region and allow the tension on the first film strip to pull the first film strip free of the splice tape, said hot shoe being further operable during the first de-splicing cycle to press the first region of the splice tape onto the pickup web thereby tacking the splice tape to the web; and means for placing said second film strip under tension after positioning said second region of the splice tape between the hot shoe and platen;

said hot shoe being operable in a second de-splicing cycle to press against said second region of the splice tape to soften said adhesive in the second region and allow the tension on the second film strip to pull the second film strip free of the splice tape.

2. The apparatus of claim 1 wherein said heat shoe is operable during the first de-splicing cycle to release sufficiently from the splice tape, after initial heating of the adhesive, to facilitate allowing the first film strip to be pulled free of said tape following which the heat shoe represses said first region of the splice tape against the carrier web to tack the splice tape to the carrier web.

3. The apparatus of claim 2 including means for advancing said pickup web at the conclusion of the first de-splicing cycle so as to place said second region of said splice tape in alignment with said heat shoe in preparation for removal of said second film strip from the splice tape in said second de-splicing cycle.

4. Apparatus for separating photographic film strips adhered with thermal adhesive to first and second regions of a splice tape, the apparatus comprising:

a platen;

a reciprocating hot shoe for successively engaging the splice tape against the platen under pressure to heat the adhesive in the first and second regions of the tape separately in first and second de-splicing cycles;

means for restricting movement of one of the film strips after the first region of the splice tape is positioned between the hot shoe and the platen;

tensioning means for holding the film strips under tension during said first de-splicing cycle;

control means operative during said first de-splicing cycle for bringing the hot shoe and platen together under pressure to soften said adhesive in said first splice region and thereafter releasing said pressure to allow the tension to pull a first film free of the first region of the splice tape, the control means thereafter being operative to repress the hot shoe against the first region of the splice tape to tack the splice tape to a splice pickup web positioned between the hot shoe and platen;

means for advancing the splice pickup web through the area between the hot shoe and platen; and means for holding the second film strip under tension with the splice tape after the splice pickup web is advanced to position the second region of the splice tape between the hot shoe and platen;

the control means being operative during the second de-splicing cycle for bringing the hot shoe and platen together under pressure to soften said adhesive and for thereafter releasing said pressure to allow tension on the second film strip to pull the second film strip free of the splice tape.

5. A method of separating photographic film strips attached to first and second adhesive regions of a splice tape comprising the steps of:

positioning the first splice tape region between a hot shoe and a platen;

positioning a pickup web between the hot shoe and platen on a side of the films opposite to the splice tape;

restricting the film strip attached to the second splice tape region from movement;

placing the film strip attached to the first splice tape region under tension;

bringing the hot shoe and platen together under pressure in a first de-splicing cycle to heat and soften splice tape adhesive in said first splice tape region;

releasing the pressure on the first splice tape region sufficiently to allow one film strip to be pulled free of the splice tape;

bringing the hot shoe and platen together under pressure after removal of the first film strip to adhere the first region of the splice tape to the carrier web, positioning said second splice tape region between said hot shoe and platen;

placing the other film strip attached to the second splice tape region under tension;

bringing the hot shoe and platen together under pressure in a second de-splicing cycle to heat the adhesive in the second splice tape region; and releasing said second cycle pressure to allow the other film strip to be pulled free of the splice tape.

6. The method of claim 5 further including the steps of:

advancing the web between the first and second de-splicing cycles to position the second region of the splice tape between the hot shoe and platen; and placing the web and second film strip in tension through the splice during the second cycle of operation.

7. The method of claim 6 wherein, during the second cycle, the web is restricted from movement and the second film strip is placed under tension.

* * * * *